US007561732B1

(12) United States Patent
Owechko et al.

(10) Patent No.: US 7,561,732 B1
(45) Date of Patent: Jul. 14, 2009

(54) METHOD AND APPARATUS FOR THREE-DIMENSIONAL SHAPE ESTIMATION USING CONSTRAINED DISPARITY PROPAGATION

(75) Inventors: Yuri Owechko, Newburry Park, CA (US); Narayan Srinivasa, Thousand Oaks, CA (US); Swarup Medasani, Thousand Oaks, CA (US); Riccardo Boscolo, Culver City, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/051,592

(22) Filed: Feb. 4, 2005

(51) Int. Cl.
*G06K 9/00* (2006.01)
(52) U.S. Cl. .................. 382/154; 382/104
(58) Field of Classification Search .......... 382/154
See application file for complete search history.

(56) References Cited

U.S. PATENT DOCUMENTS

| | | | | |
|---|---|---|---|---|
| 5,247,583 A * | 9/1993 | Kato et al. | | 382/164 |
| 5,309,522 A * | 5/1994 | Dye | | 382/154 |
| 5,561,431 A * | 10/1996 | Peele et al. | | 342/90 |
| 5,995,644 A * | 11/1999 | Lai et al. | | 382/131 |
| 6,026,340 A * | 2/2000 | Corrado et al. | | 701/47 |
| 6,078,253 A * | 6/2000 | Fowler | | 340/501 |
| 6,295,373 B1 | 9/2001 | Mahalanobis et al. | | |
| 6,307,959 B1 * | 10/2001 | Mandelbaum et al. | | 382/154 |
| 6,452,870 B1 * | 9/2002 | Breed et al. | | 367/99 |
| 6,529,809 B1 * | 3/2003 | Breed et al. | | 701/45 |
| 6,701,005 B1 * | 3/2004 | Nichani | | 382/154 |
| 6,754,379 B2 * | 6/2004 | Xiong et al. | | 382/154 |
| 6,914,599 B1 * | 7/2005 | Rowe et al. | | 345/420 |
| 6,961,443 B2 * | 11/2005 | Mahbub | | 382/100 |
| 7,289,662 B2 * | 10/2007 | Keaton et al. | | 382/154 |
| 7,505,841 B2 * | 3/2009 | Sun et al. | | 701/45 |
| 2002/0001398 A1 * | 1/2002 | Shimano et al. | | 382/104 |

(Continued)

FOREIGN PATENT DOCUMENTS

WO    WO 02 30717 A    4/2002

OTHER PUBLICATIONS

Mirhosseini, A.R. Hong Yau Chen, C. Pham, T., "Human Face Recognition: a Minimal Evidence Approach", Computer Vision, 1998. Sixth International Conference on, Jan. 4-7, 1998, pp. 652-659.*

(Continued)

*Primary Examiner*—Matthew C. Bella
*Assistant Examiner*—Sath V. Perungavoor
(74) *Attorney, Agent, or Firm*—Tope-McKay & Associates

(57) ABSTRACT

A method, an apparatus, and a computer program product for three-dimensional shape estimation using constrained disparity propagation are presented. An act of receiving a stereoscopic pair of images of an area occupied by at least one object is performed. Next, pattern regions and non-pattern regions are detected in the images. An initial estimate of spatial disparities between the pattern regions in the images is generated. The initial estimate is used to generate a subsequent estimate of the spatial disparities between the non-pattern regions. The subsequent estimate is used to generate further subsequent estimates of the spatial disparities using the disparity constraints until there is no change between the results of subsequent iterations, generating a final estimate of the spatial disparities. A disparity map of the area occupied by at least one object is generated from the final estimate of the three-dimensional shape.

20 Claims, 10 Drawing Sheets

U.S. PATENT DOCUMENTS

| | | | | |
|---|---|---|---|---|
| 2002/0134151 | A1* | 9/2002 | Naruoka et al. | 73/291 |
| 2002/0191837 | A1* | 12/2002 | Takeda et al. | 382/154 |
| 2003/0091228 | A1* | 5/2003 | Nagaoka et al. | 382/154 |
| 2003/0204384 | A1* | 10/2003 | Owechko et al. | 703/1 |
| 2004/0022418 | A1* | 2/2004 | Oota | 382/106 |
| 2004/0022437 | A1* | 2/2004 | Beardsley | 382/199 |
| 2004/0105579 | A1* | 6/2004 | Ishii et al. | 382/154 |
| 2004/0240754 | A1* | 12/2004 | Smith et al. | 382/286 |
| 2004/0247158 | A1* | 12/2004 | Kohler et al. | 382/104 |
| 2004/0252862 | A1* | 12/2004 | Camus et al. | 382/104 |
| 2004/0252863 | A1* | 12/2004 | Chang et al. | 382/104 |
| 2004/0252864 | A1* | 12/2004 | Chang et al. | 382/104 |
| 2005/0196015 | A1* | 9/2005 | Luo et al. | 382/103 |
| 2005/0196035 | A1* | 9/2005 | Luo et al. | 382/159 |
| 2005/0201591 | A1* | 9/2005 | Kiselewich | 382/104 |
| 2007/0055427 | A1* | 3/2007 | Sun et al. | 701/45 |

OTHER PUBLICATIONS

Konrad, J., Lan, Z.D., "Dense Disparity Estimation from Feature Correspondences", Proceedings of SPIE—vol. 3957 Stereoscopic Displays and Virtual Reality Systems VII, John O. Merritt, Stephen A. Benton, Andrew J. Woods, Mark T. Bolas, Editors, May 2000, pp. 90-101.*

Gautama, S., Lacroix, S., Devy, M., "Evaluation of Stereo Matching Algorithms for Occupant Detection", Recognition, Analysis, and Tracking of Faces and Gestures in Real-Time Systems, 1999. Proceedings. International Workshop on, 1999, pp. 177-184.*

Devy, M., Giralt A., Marin-Hernandez, A., "Detection and Classification of Passenger Seat Occupancy using Stereovision", Intelligent Vehicles Symposium, 2000. IV 2000. Proceedings of the IEEE, pp. 714-719.*

A. Mancini and J. Konrad, "Robust quadtree-based disparity estimation for the reconstruction of intermediate stereoscopic images," in Proc. SPIE Stereoscopic Displays and Virtual Reality Systems, vol. 3295, pp. 53-64, Jan. 1998.*

Mian, T.M., "Fuzzy Logic Based Automotive Airbag Control System", Dec. 1999, graduate thesis University of Windsor, <URL:http://www.collectionscanada.ca/obj/s4/f2/dsk1/tape4/PQDD_0011/MQ52612.pdf>, pp. 80-103.*

Izquierdo, E., et al., "Nonlinear Gaussian filtering approach for object segmentation," IEE Proceedings: Vision, Image and Signal Processing, Institution of Electrical Engineers, GB, vol. 146, No. 3, Jun. 23, 1999, pp. 137-143, XP006013796.

Devy, M., et al., "Detection and Classification of Passenger Seat Occupancy using stereovision," Intelligent Vehicles Symposium, 2000. Proceedings of the IEEE Dearborn, MI, USA Oct. 3-5, 2000, Piscataway, NJ, USA, IEEE, US, Oct. 3, 2000, pp. 714-719, XP010529022.

Miller, J.T., et al., "Segmentation of Object Surfaces Using the Haar Wavelet at Multiple Resolutions," Proceedings of the International Conference on Image Processing(ICIP) Austin, Nov. 13-16, 1994, Los Alamitos, vol. 3, conf. 1, pp. 475-477, XP010146337.

Office Action #1, dated Sep. 20, 2005, for U.S. Appl. No. 10/132,875 with references.

Office Action #2, dated Feb. 8, 2006, for U.S. Appl. No. 10/132,875.

Interview Summary and Office Action #3, dated Feb. 8, 2006, for U.S. Appl. No. 10/132,875.

Office Action #4, dated Aug. 14, 2006, for U.S. Appl. No. 10/132,875 with references.

Office Action #5, dated Mar. 22, 2007, for U.S. Appl. No. 10/132,875.

Office Action #6, dated Oct. 10, 2007, for U.S. Appl. No. 10/132,875.

Office Action #7, dated May 29, 2008, for U.S. Appl. No. 10/132,875 with references.

J.L. Barron, D.J. Fleet, and S.S. Beauchemin, "Performance of Optical Flow Techniques," International Journal of Computer Vision, vol. 12, No. 1, pp. 43-77, 1994.

D.W. Paglieroni, "Distance Transform: Properties and Machine Vision Applications," Computer Vision, Graphics and Image Processing, vol. 27, pp. 526-535, 1992.

Krishapuram R. and Lee J., "Fuzzy-Set-Based Hierarchical Networks for Information Fusion in Computer Vision," Neural Networks 5, 335-350, 1992.

Dempster, A.P., Laird, N.M., and Rubin, "Maximum Likelihood form incomplete data via the EM algorithm," Journal of Royal Statistical Society B, 39(2), 1-38, 1977.

D.P. Huttenlocher, G. Klanderman, and W. Rucklidge, "Comparing Images Using the Hausdorf Distance," IEEE Transactions on Pattern Analysis and Machine Intelligence, vol. 15, No. 9, pp. 850-863, Sep. 1993.

Quinlan, J.R., "Decision trees and decision-making," IEEE Trans. On Systems, Man and Cybernetics 20, 2 339-346, 1990.

Mao, J., and Jain, A.K., "Artificial Neural Networks for Feature Extraction and Multivariate Data Projections," IEEE Transactions on Neural Networks, vol. 6, No. 2, Mar. 1995.

Dyckhoff H. and Pedrycz, W., "Generalized means as a model of compensation connectives," Cytometry, 14, 627-639, Year: 1984.

* cited by examiner

FIG. 4

| 24 | n/a | 20 |
|---|---|---|
| 25 |  | n/a |
| 28 | 24 | n/a |

FIG. 6

METHOD AND APPARATUS FOR THREE-DIMENSIONAL SHAPE ESTIMATION USING CONSTRAINED DISPARITY PROPAGATION

PRIORITY CLAIM

This application claims the benefit of priority to utility application Ser. No. 10/132,875, filed in the United States on Apr. 24, 2002, and titled "High-Performance Sensor Fusion Architecture."

BACKGROUND OF THE INVENTION (1) Technical Field

The present invention relates to general techniques for computer vision and object classification. More specifically, the present invention relates to use of constrained disparity with stereoscopic images to generate three-dimensional shape estimates.

(2) Discussion

Matching features in images of a scene taken from two different viewpoints (stereoscopic images) is a major problem in the art of machine vision systems. A variety of constraint-based solutions have been proposed, and have met with varying degrees of success because there is no general solution to the problem and a set of constraints applied to one scene may not be appropriate for other scenes.

In particular, a three-dimensional scene is reduced to two-dimensional images when captured by an imaging device. Thus, the pictures each contain less information than the original scene. In the art of stereoscopic imaging, a pair of two-dimensional images, each taken from a different location, is used to approximate the information from the original three-dimensional scene. However, in attempting to reconstruct the original three-dimensional scene, another problem arises—that of identifying corresponding points in the pair of images. In other words, for any individual pixel in one image, there are many potential corresponding pixels in the other image. Thus, a major difficulty in the art is determining corresponding pixels in the images so that disparities between the images may be determined in order to approximate the original three-dimensional scene.

Accordingly, there exists a need in the art for a fast and reliable system for approximating a three-dimensional scene from stereoscopic images. The present invention provides such a system, using a texture filter to generate a disparity estimate and refining the disparity estimate iteratively using disparity constraints until a final estimate is achieved.

SUMMARY OF THE INVENTION

The features of the present invention may be combined in many ways to produce a great variety of specific embodiments, as will be appreciated by those skilled in the art. Furthermore, the means which comprise the apparatus are analogous to the means present in computer program product embodiments and to the acts in the method embodiment.

The present invention teaches a method, an apparatus, and a computer program product for three-dimensional shape estimation using constrained disparity propagation. The invention performs an operation of receiving a stereoscopic pair of images of an area occupied by at least one object. Next, an operation of detecting pattern regions and non-pattern regions within each of the pair of images using a texture filter is performed. Then, an operation of generating an initial estimate of spatial disparities between the pattern regions within each of the pair of images is executed. Next, an operation of using the initial estimate to generate a subsequent estimate of the spatial disparities between the non-pattern regions based on the spatial disparities between the pattern regions using disparity constraints is performed. Subsequently, an operation of iteratively using the subsequent estimate as the initial estimate in the act of using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities is performed. Finally, an operation of generating a disparity map of the area occupied by at least one object from the final estimate of the three-dimensional shape is executed.

In a further aspect, the at least one object comprises a vehicle occupant and the area comprises a vehicle occupancy area, the method further comprising an act of processing the final estimate to provide signals to vehicle systems.

In a still further aspect, the invention performs an operation of capturing images from a sensor selected from a group consisting of CMOS vision sensors and CCD vision sensors.

In a yet further aspect, the signals comprise airbag enable and disable signals.

In another aspect, the act of extracting image features further comprises operations of processing the disparity map with at least one of the classification algorithms to produce object class confidence data.

In yet another aspect, the classification algorithm is selected from the group consisting of a trained C5 decision tree, a trained Nonlinear Discriminant Analysis network, and a trained Fuzzy Aggregation Network.

In a further aspect, an operation of data fusion is performed on the object class confidence data to produce a detected object estimate.

It will be appreciated by one of skill in the art that the "operations" of the present invention just discussed have parallels in acts of a method, and in modules or means of an apparatus or computer program product and that various combinations of these features can be made without departing from the spirit and scope of the present invention.

BRIEF DESCRIPTION OF THE DRAWINGS

The objects, features and advantages of the present invention will be apparent from the following detailed descriptions of the preferred embodiment of the invention in conjunction with reference to the following drawings, where:

FIG. 4 depicts a neighborhood density map created during the disparity estimation act, whose entries specify the number of points in an 8-connected neighborhood where a disparity estimate is available;

FIG. 6 depicts an example of a 3×3 neighborhood where the disparity of the central element has to be estimated;

DETAILED DESCRIPTION OF PREFERRED EMBODIMENTS

Figure 1:
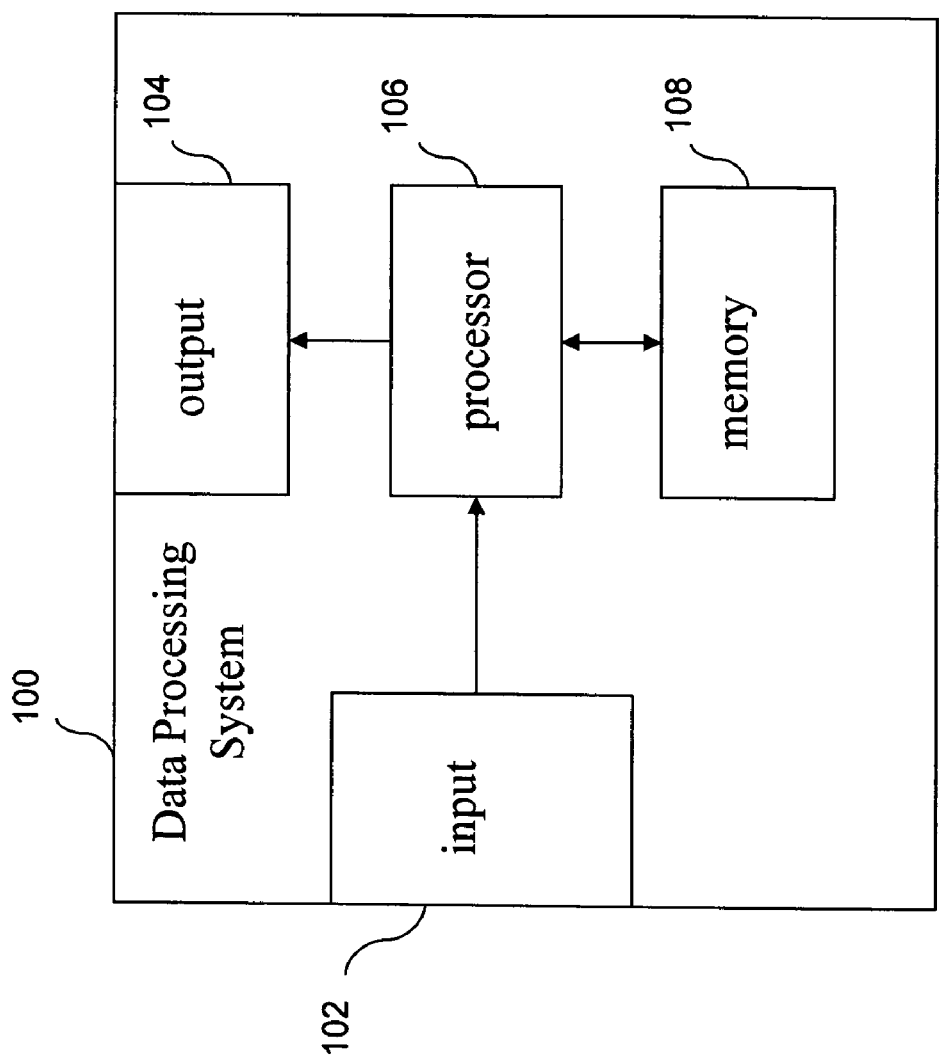
FIG. 1 is a block diagram depicting the components of a computer system used in the present invention.

The present invention relates general techniques to computer vision and object classification. More specifically, the present invention relates to use of constrained disparity with stereoscopic images to generate three-dimensional shape estimates. The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of embodiments. Thus, the present invention is not intended to be limited to the embodiments presented, but is to be accorded the widest scope consistent with the principles and novel features disclosed herein. Furthermore it should be noted that unless explicitly stated otherwise, the figures included herein are illustrated diagrammatically and without any specific scale, as they are provided as qualitative illustrations of the concept of the present invention.

In order to provide a working frame of reference, first a glossary of terms used in the description and claims is given as a central resource for the reader. Next, a discussion of various principal embodiments of the present invention is provided. Finally, a discussion is provided to give an understanding of the specific details.

(1) Glossary

Before describing the specific details of the present invention, a centralized location is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more clearly explaining the terms used.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium.

Object: The term object as used herein is generally intended to indicate a physical object within a scene for which a three-dimensional estimate is desired.

Sensor: The term sensor as used herein generally includes any imaging sensor such as, but not limited to, optical sensors such as CCD cameras

(2) Principal Embodiments

The present invention has three principal "principal" embodiments. The first is a system for determining operator distraction, typically in the form of a computer system operating software or in the form of a "hard-coded" instruction set. This system may be incorporated into various devices, non-limiting examples of which include vehicular warning systems, three-dimensional modeling systems, and robotic vision systems incorporated in manufacturing plants. Information from the system may also be incorporated/fused with data from other sensors or systems to provide more robust information regarding the object observed. The second principal embodiment is a method, typically in the form of software, operated using a data processing system (computer). The third principal embodiment is a computer program product. The computer program product generally represents computer readable code stored on a computer readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These embodiments will be described in more detail below.

A block diagram depicting the components of a computer system used in the present invention is provided in FIG. 1. The data processing system 100 comprises an input 102 for receiving information from at least one sensor (generally a pair of imaging devices) for use in obtaining stereoscopic images of a scene. Note that the input 102 may include multiple "ports." Typically, input is received from sensors placed about the scene, non-limiting examples of which include CMOS and CCD vision sensors. The output 104 is connected with the processor for providing information regarding the object(s) to other systems. Output may, for example, be provided as a three-dimensional estimate of the scene for a variety of applications surveillance, object identification/recognition, and three-dimensional modeling. Output may also be provided to other devices or other programs, e.g. to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software to be manipulated by commands to the processor.

Figure 2:
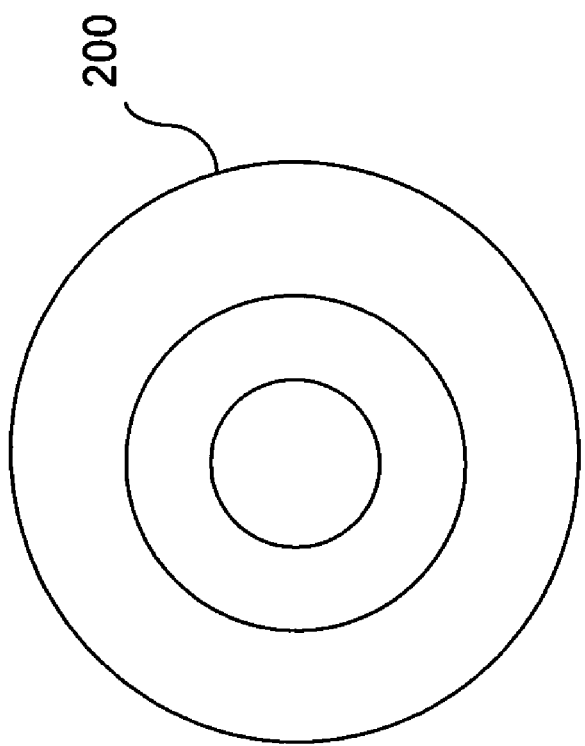
FIG. 2 is an illustrative diagram of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer readable code stored on any compatible computer readable medium.

(3) Introduction

Figure 3:
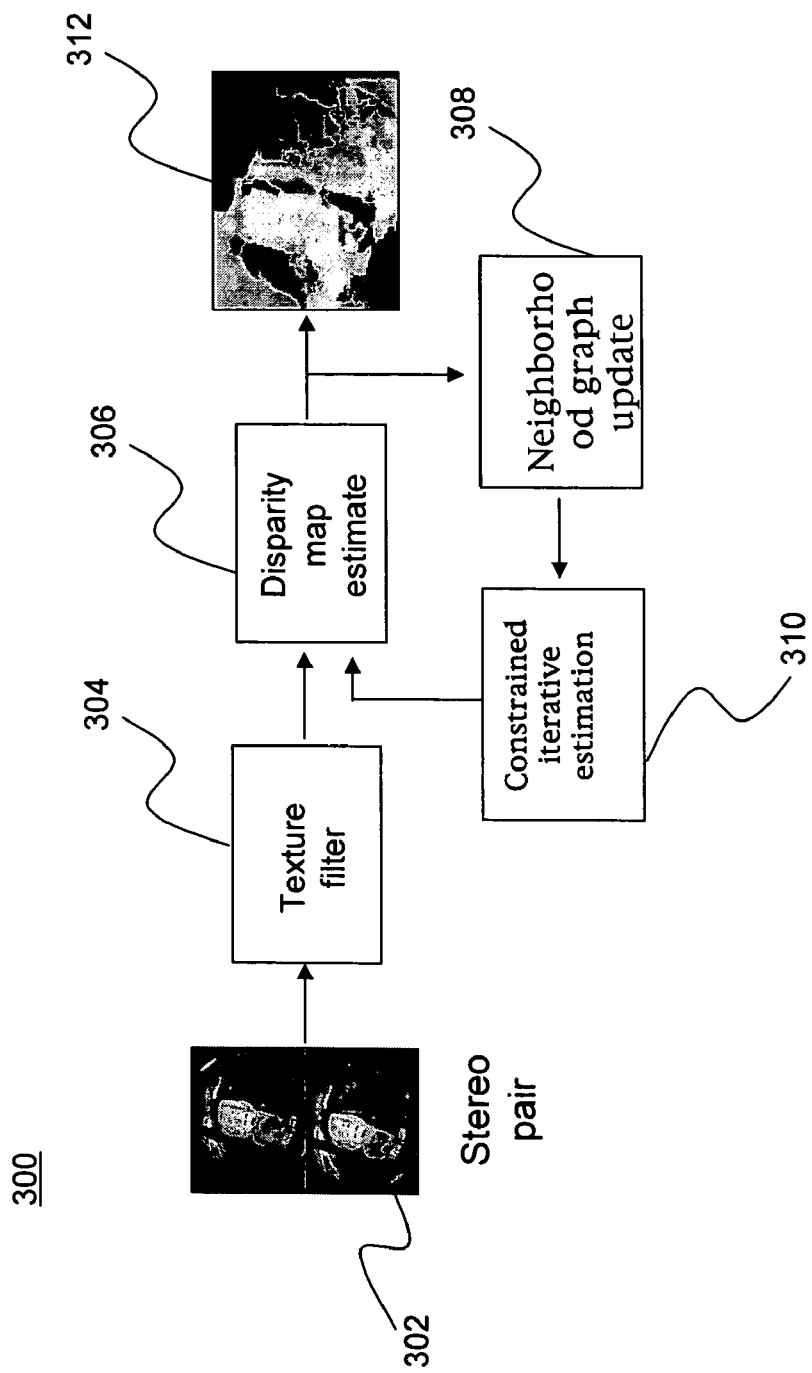
FIG. 3 is a block diagram depicting the components (acts) of the disparity map module.

As shown in FIG. 3, the disparity estimation procedure used in the Disparity Map module 300 is based on image disparity. The procedure used by the present invention provides a very fast time-response, and, as a non-limiting example, may be configured to compute a dense disparity map (more than 300 points) on an arbitrary grid at a rate of 50 frames per second. A stereo pair of images 302 is received from a stereo camera, and is provided as input to a texture filter 304. The task of the texture filter 304 is to identify those regions of the images characterized by the presence of recognizable features, and which are thus suitable for estimating disparities. An initial disparity map is estimated from the output of the texture filter 304 by a disparity map estimator 306. Once the disparity of the points belonging to this initial set has been estimated, the computation of the disparity values for the remaining points is carried on iteratively as a constrained estimation problem. In order to do so, first a neighborhood graph update 308 is performed, and a constrained iterative estimation 310 is performed. In this process, denser neighborhoods are examined first and the disparity values of adjacent points are used to bound the search interval. Using this approach, smooth disparity maps are guaranteed and large errors due to matching of poorly textured regions are highly reduced. As this iterative process progresses, a disparity map 312 is generated, and can be used for object classification. In simpler terms, the Disparity Map Module 300 receives two images from different locations. Based on the differences in the images a disparity map is generated, representing a coarse estimate of the surface variations or patterns present in area of the images. The surface variations or patterns are then classified in order to determine a likely type of object to which they belong. Note that if the range to one pixel is known, the disparity map can also be used to generate a coarse range map. More detail regarding the operation of the Disparity Map Module 300 is provided below.

Several choices are available for the selection of a texture filter 304 for recognizing regions of the image characterized by salient features, and the present invention may use any of them as suited for a particular embodiment. In an embodiment, a simple texture filter 304 was used for estimating the mean variance of the rows of a selected region of interest. This choice reflects the necessity of identifying those image blocks that present a large enough contrast along the direction of the disparity search. For a particular N×M region of the image I, where (x,y) are image coordinates and $\sigma^2$ is variable, the following quantity:

$$\sigma^2 = \frac{1}{M(N-1)} \sum_{y=0}^{M-1} \sum_{x=0}^{N-1} \left( I(x,y) - \frac{1}{N} \sum_{x=0}^{N-1} I(x,y) \right)^2 \quad (1)$$

is compared against a threshold defining the minimum variance considered sufficient to identify a salient image feature. Once the whole image has been filtered and the regions rich in texture have been identified, the disparity values of the selected regions are estimated minimizing the following cost function in order to perform the matching between the left and right image (where $d^{(opt)}$ is an optimal value and d is an offset distance):

$$d^{(opt)} = \min_{d} \sum_{y=0}^{M-1} \sum_{x=0}^{N-1} |I_{left}(x+d,y) - I_{right}(x,y)|. \quad (2)$$

Figure 4:
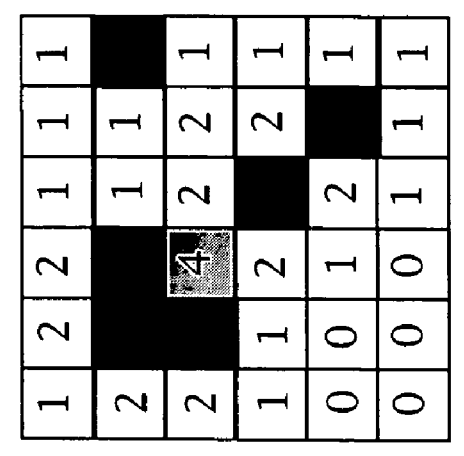

During the disparity estimation act, a neighborhood density map is created. This structure consists of a matrix of the same size as the disparity map, whose entries specify the number of points in an 8-connected neighborhood where a disparity estimate is available. An example of such a structure is depicted in FIG. 4.

Figure 5:
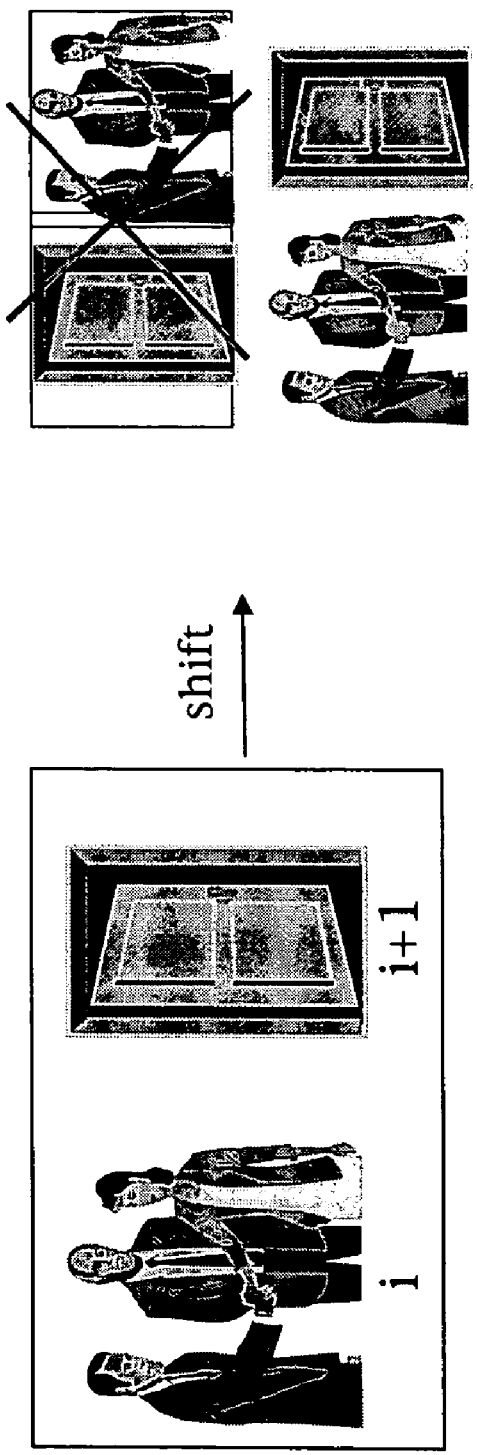
FIG. 5 depicts an example of allowed and prohibited orders of appearance of image elements.

Once the initialization stage is completed, the disparity information available is propagated starting from the denser neighborhoods. Two types of constraints are enforced during the disparity propagation. The first type of constraint ensures that the order of appearance of a set of image features along the x direction is preserved. This condition, even though it is not always satisfied, is generally true in most situations where the camera's base distance is sufficiently small. An example of allowed and prohibited orders of appearance of image elements is depicted in FIG. 5. This consistency requirement translates in the following set of hard constraints on the minimum and maximum value of the disparity in a given block i:

$$d^{(i)}_{min} = d^{(i-1)} - \epsilon \text{ and} \quad (3)$$

$$d^{(i)}_{max} = d^{(i+1)} + \epsilon, \text{ where} \quad (4)$$

$$\epsilon = |x_i - x_{i-1}|. \quad (5)$$

This type of constraint is very useful for avoiding false matches of regions with similar features.

Figure 6:
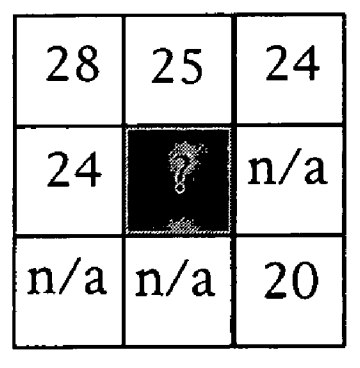

The local smoothness of the disparity map is enforced by the second type of propagation constraint. An example of a 3×3 neighborhood where the disparity of the central element has to be estimated is shown in FIG. 6. In this example, the local smoothness constraints are:

$$d_{min} = \min\{d \epsilon N_{ij}\} - \eta \text{ and} \quad (6)$$

$$d_{max} = \max\{d \epsilon N_{ij}\} + \eta, \text{ where} \quad (7)$$

$$N_{ij} = \{p_{m,n}\}, m = i-1, \ldots, i+1, \text{ and } n = j-1, \ldots, j+1. \quad (8)$$

The concept is that very large local fluctuations of the disparity estimates are more often due to matching errors that to true sharp variations. As a consequence, enforcing a certain degree of smoothness in the disparity map greatly improves the signal-to-noise ratio of the estimates. In an embodiment, the parameter $\eta$ is forced equal to zero, thus bounding the search interval of possible disparities between the minimum and maximum disparity currently measured in the neighborhood.

Additional constraints to the disparity value propagation based on the local statistics of the grayscale image are enforced. This feature attempts to lower the amount of artifacts due to poor illumination conditions and poorly textured areas of the image, and addresses the issue of propagation of disparity values across object boundaries. In an effort to reduce the artifacts across the boundaries between highly textured objects and poorly textured objects, some local statistics of the regions of interest used to perform the disparity estimation are computed. This is done for the entire frame, during the initialization stage of the algorithm. The iterative propagation technique takes advantage of the computed statistics to enforce an additional constraint to the estimation process. The results obtained by applying the algorithm to several sample images have produced a net improvement in the disparity map quality in the proximity of object boundaries and a sharp reduction in the amount of artifacts present in the disparity map.

Because the disparity estimation is carried out in an iterative fashion, the mismatch value for a particular image block and a particular disparity value usually need to be evaluated several times. The brute force computation of such cost function every time its evaluation is required is computationally inefficient. For this reason, an ad-hoc caching technique is preferred in order to greatly reduce the system time-response and provide a considerable increase in the speed of the estimation process. The quantity that is stored in the cache is the mismatch measure for a given disparity value in a particular point of the disparity grid. In a series of simulations, the number of hits in the cache averaged over 80%, demonstrating the usefulness of the technique.

The last component of the Disparity Map module 300 is an automatic vertical calibration subroutine (not shown in the figure). This functionality is particularly useful for compensating for hardware calibration tolerances. While an undetected horizontal offset between the two cameras usually causes only limited errors in the disparity evaluation, the presence of even a small vertical offset can be catastrophic. The rapid performance degradation of the matching algorithm when such an offset is present is a very well-known problem that affects all stereo camera-based ranging systems.

A fully automated vertical calibration subroutine is based on the principle that the number of correctly matched image features during the initialization stage is maximized when there is no vertical offset between the left and right image. The algorithm is run during system initialization and after periodically to check for the consistency of the estimate.

(b) System Performance

Figure 7:
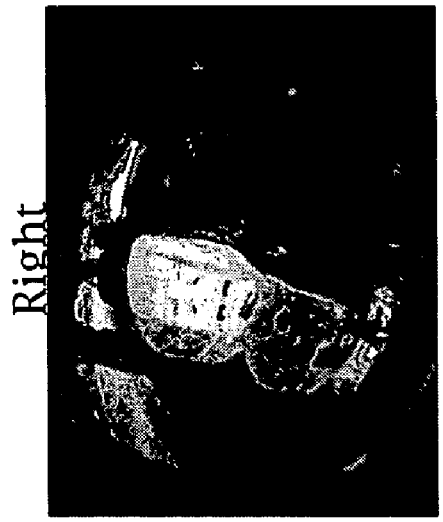
FIG. 7 depicts an example of a stereo image pair corresponding to the disparity map depicted in FIG. 8.
Figure 7:
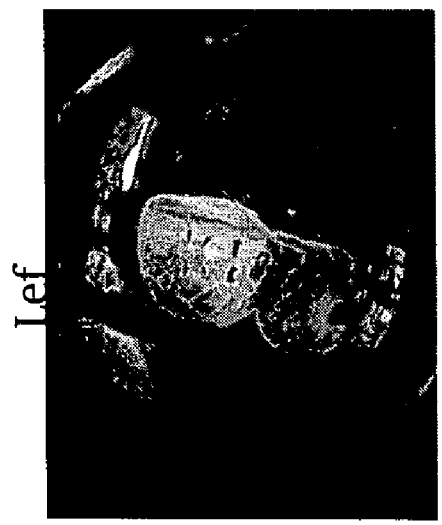
Figure 8:
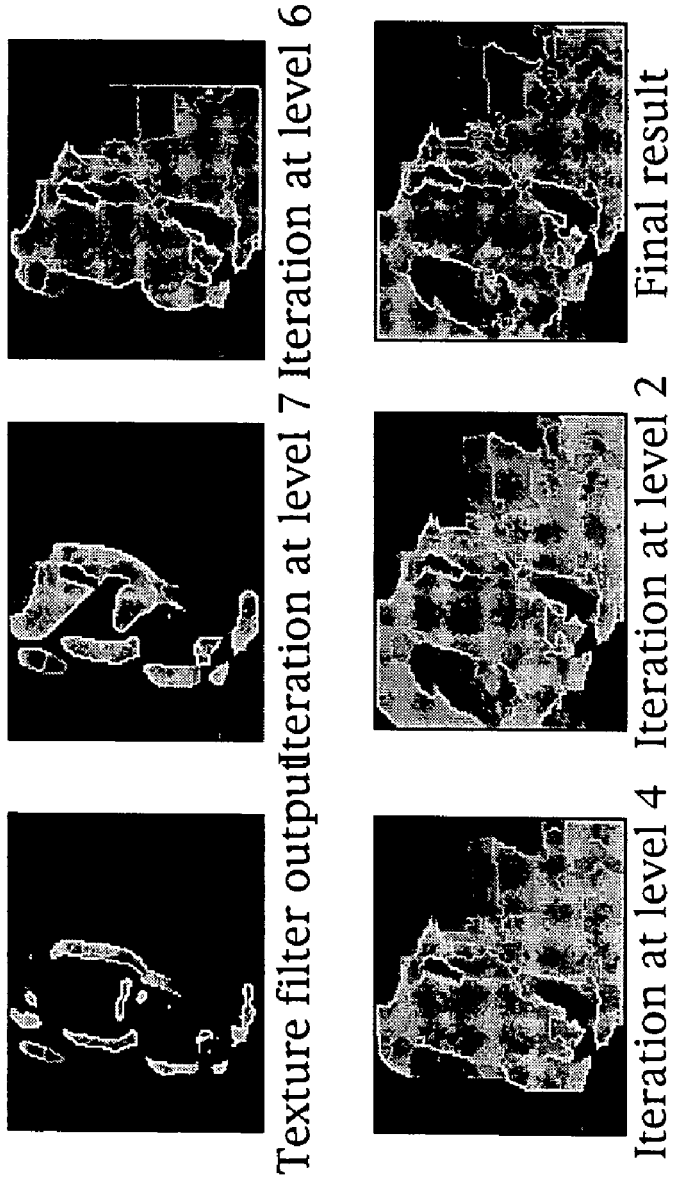
FIG. 8 depicts the disparity map corresponding to the stereo image pair shown in FIG. 7, with the disparity map computed at several iteration levels.
Figure 9:
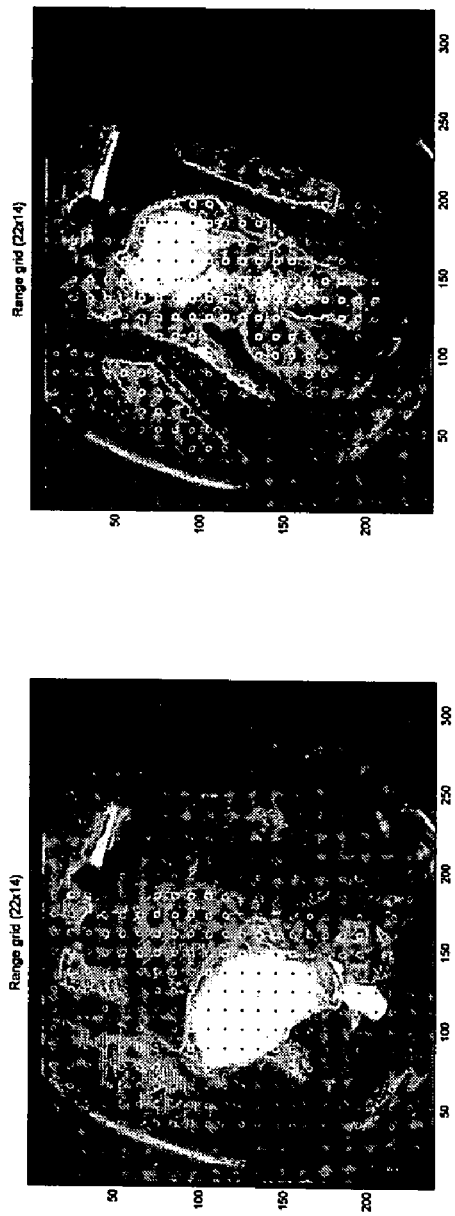
FIG. 9 is an illustrative example of an actual occupant with a disparity grid superimposed for facilitating an accurate selection of the points used to estimate the disparity profile.
Figure 10:
FIG. 10 depicts several examples of disparity maps obtained for different types of occupants.
Figure 10:
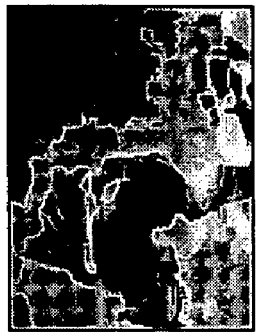
Figure 10:
Figure 10:
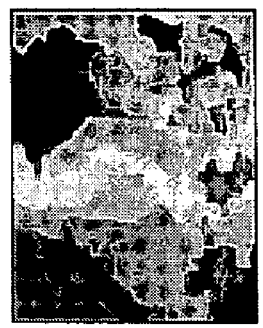
Figure 10:
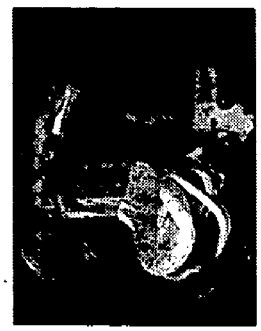
Figure 10:

An example of a stereo image pair is shown in FIG. 7, and its corresponding computed disparity map at several iteration levels is shown in FIG. 8. In order to maximize the performance of the system, the grid over which the disparity values are estimated is tailored around the region where the seat occupant is most likely to be present. An example of an actual occupant with the disparity grid superimposed is depicted in FIG. 9. An accurate selection of the points used to estimate the disparity profile, in fact, resulted in highly improved sensitivity and specificity of the system. Several further examples of disparity maps obtained for different types of occupants are depicted in FIG. 10.

What is claimed is:

1. A method for three-dimensional shape estimation using constrained disparity propagation, the method comprising an act of causing a processor to perform operations of extracting image features, wherein the operations of extracting image features comprises the acts of:
    receiving a stereoscopic pair of images of an area occupied by at least one object;
    detecting pattern regions and non-pattern regions within each of the pair of images using a texture filter;
    generating an initial estimate of spatial disparities between the pattern regions within each of the pair of images;
    using the initial estimate to generate a subsequent estimate of the spatial disparities between the non-pattern regions based on the spatial disparities between the pattern regions using disparity constraints;
    iteratively using the subsequent estimate as the initial estimate in the act of using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;
    processing the final estimate to provide signals, wherein the signals comprise enable and disable signals of a vehicle;
    generating a disparity map of the area occupied by at least one object from the final estimate of the three-dimensional shape; and
    processing the disparity map with at least one classification algorithm to produce object class confidence data, said classification algorithm is selected from the group consisting of a trained C5 decision tree, a trained Nonlinear Discriminant Analysis network, and a trained Fuzzy Aggregation Network.

2. The method of claim 1, where the at least one object comprises a vehicle occupant and the area comprises a vehicle occupancy area.

3. The method of claim 1, wherein the method further comprises an act of capturing images from a sensor selected from a group consisting of CMOS vision sensors and CCD vision sensors.

4. The method of claim 2, wherein the signals comprise airbag enable and disable signals.

5. The method of claim 1, wherein an act of data fusion is performed on the object class confidence data to produce a detected object estimate.

6. An apparatus for object detection comprising a computer system including a processor, a memory coupled with the processor, an input coupled with the processor for receiving images, and an output coupled with the processor for outputting information based on an object estimation, wherein the computer system further comprises means for:
    receiving a stereoscopic pair of images of an area occupied by at least one object;
    detecting pattern regions and non-pattern regions within each of the pair of images using a texture filter;
    generating an initial estimate of spatial disparities between the pattern regions within each of the pair of images;
    using the initial estimate to generate a subsequent estimate of the spatial disparities between the non-pattern regions based on the spatial disparities between the pattern regions using disparity constraints;
    iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;
    processing the final estimate to provide signals, wherein the signals comprise enable and disable signals of a vehicle;
    generating a disparity map of the area occupied by at least one object from the final estimate of the three-dimensional shape; and
    processing the disparity map with at least one classification algorithm to produce object class confidence data, said classification algorithm is selected from the group consisting of a trained C5 decision tree, a trained Nonlinear Discriminant Analysis network, and a trained Fuzzy Aggregation Network.

7. The apparatus of claim 6, where the at least one object comprises a vehicle occupant and the area comprises a vehicle occupancy area.

8. The apparatus of claim 6, wherein the apparatus further comprises a means for capturing images from a sensor selected from a group consisting of CMOS vision sensors and CCD vision sensors.

9. The apparatus of claim 7, wherein the signals comprise airbag enable and disable signals.

10. The apparatus of claim 6, wherein a means for data fusion is performed on the object class confidence data to produce a detected object estimate.

11. An apparatus for object detection comprising a computer system including a processor, a memory coupled with the processor, an input coupled with the processor for receiving images, and an output coupled with the processor for outputting information based on an object estimation, wherein the computer system further comprises:

a receiving module for receiving a stereoscopic pair of images of an area occupied by at least one object;

a pattern region detector for detecting pattern regions and non-pattern regions within each of the pair of images using a texture filter;

an estimator for generating an initial estimate of spatial disparities between the pattern regions within each of the pair of images;

a subsequent estimator using the initial estimate to generate a subsequent estimate of the spatial disparities between the non-pattern regions based on the spatial disparities between the pattern regions using disparity constraints;

an iterator for iteratively using the subsequent estimate as the initial estimate in the subsequent estimator to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;

an estimate processor for processing the final estimate to provide signals, wherein the signals comprise enable and disable signals of a vehicle;

a map generator for generating a disparity map of the area occupied by at least one object from the final estimate of the three-dimensional shape; and an object class confidence data generator for processing the disparity map with at least one classification algorithm to produce object class confidence data, said classification algorithm is selected from the group consisting of a trained C5 decision tree, a trained Nonlinear Discriminant Analysis network, and a trained Fuzzy Aggregation Network.

12. The apparatus of claim 11, where the at least one object comprises a vehicle occupant and the area comprises a vehicle occupancy area.

13. The apparatus of claim 11, wherein the apparatus further comprises an image capturing device for capturing images from a sensor selected from a group consisting of CMOS vision sensors and CCD vision sensors.

14. The apparatus of claim 12, wherein the signals comprise airbag enable and disable signals.

15. The apparatus of claim 11, wherein a data fuser performs data fusion on the object class confidence data to produce a detected object estimate.

16. A computer program product for object detection encoded on a computer-readable medium, having encoded therein, means for:

receiving a stereoscopic pair of images of an area occupied by at least one object;

detecting pattern regions and non-pattern regions within each of the pair of images using a texture filter;

generating an initial estimate of spatial disparities between the pattern regions within each of the pair of images;

using the initial estimate to generate a subsequent estimate of the spatial disparities between the non-pattern regions based on the spatial disparities between the pattern regions using disparity constraints;

iteratively using the subsequent estimate as the initial estimate in the means for using the initial estimate to generate a subsequent estimate in order to generate further subsequent estimates of the spatial disparities between the non-pattern regions based on the spatial disparities between the pattern regions using the disparity constraints until there is no change between the results of subsequent iterations, thereby generating a final estimate of the spatial disparities;

processing the final estimate to provide signals, wherein the signals comprise enable and disable signals of a vehicle;

generating a disparity map of the area occupied by at least one object from the final estimate of the three-dimensional shape; and processing the disparity map with at least one classification algorithm to produce object class confidence data, said classification algorithm is selected from the group consisting of a trained C5 decision tree, a trained Nonlinear Discriminant Analysis network, and a trained Fuzzy Aggregation Network.

17. The computer program product of claim 16, where the at least one object comprises a vehicle occupant and the area comprises a vehicle occupancy area.

18. The computer program product of claim 16, wherein the computer program product further comprises a means for capturing images from a sensor selected from a group consisting of CMOS vision sensors and CCD vision sensors.

19. The computer program product of claim 17, wherein the signals comprise airbag enable and disable signals.

20. The computer program product of claim 16, wherein a means for data fusion is performed on the object class confidence data to produce a detected object estimate.

\* \* \* \* \*